United States Patent
Suh

(10) Patent No.: US 7,411,876 B2
(45) Date of Patent: Aug. 12, 2008

(54) APPARATUS AND METHOD FOR CONTROLLING TRACKING IN DISC DRIVE BY MONITORING TRACKING ACTUATOR DEVIATION

(75) Inventor: Jung-bum Suh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 572 days.

(21) Appl. No.: 10/670,191

(22) Filed: Sep. 26, 2003

(65) Prior Publication Data

US 2004/0066718 A1   Apr. 8, 2004

(30) Foreign Application Priority Data

Oct. 2, 2002  (KR)  .................. 10-2002-0060100

(51) Int. Cl.
*G11B 7/00* (2006.01)
(52) U.S. Cl. .................. 369/44.25; 369/44.29
(58) Field of Classification Search .............. 369/44.25, 369/44.35, 44.29
See application file for complete search history.

(56) References Cited

U.S. PATENT DOCUMENTS

| | | | | |
|---|---|---|---|---|
| 5,258,966 A * | 11/1993 | Yanagi | .................. | 369/30.17 |
| 5,341,353 A * | 8/1994 | Yoshio et al. | .................. | 369/44.28 |
| 5,510,938 A * | 4/1996 | Sakakibara et al. | ...... | 360/77.14 |
| 5,631,886 A * | 5/1997 | Suzuki | .................. | 369/44.25 |
| 5,675,561 A * | 10/1997 | Yoshioka | .................. | 369/44.25 |
| 5,796,687 A * | 8/1998 | Baba | .................. | 369/44.29 |
| 5,870,356 A * | 2/1999 | Ikeda | .................. | 369/30.15 |
| 5,892,741 A * | 4/1999 | Kadowaki et al. | ........ | 369/44.29 |
| 6,141,305 A * | 10/2000 | Tsutsui | .................. | 369/44.32 |
| 6,266,301 B1 * | 7/2001 | Morimoto | .................. | 369/44.23 |
| 6,388,963 B1 * | 5/2002 | Tanaka | .................. | 369/44.26 |
| 6,597,528 B1 * | 7/2003 | Pang et al. | ............... | 360/78.04 |
| 6,600,622 B1 * | 7/2003 | Smith | .................. | 360/77.06 |
| 6,678,221 B2 * | 1/2004 | Fujimoto | .................. | 369/44.29 |
| 6,693,861 B1 * | 2/2004 | Lim | .................. | 369/44.28 |
| 6,760,289 B1 * | 7/2004 | Ide | .................. | 369/53.2 |
| 7,035,175 B2 * | 4/2006 | Kitayama et al. | ......... | 369/44.29 |
| 7,095,685 B2 * | 8/2006 | Turner et al. | ............. | 369/44.28 |
| 7,126,894 B2 * | 10/2006 | Akiyama | .................. | 369/47.5 |

FOREIGN PATENT DOCUMENTS

KR   10-2001-0076557   8/2001

* cited by examiner

*Primary Examiner*—Gautam R Patel
(74) *Attorney, Agent, or Firm*—Staas & Halsey LLP

(57) ABSTRACT

An apparatus and method of controlling tracking in a disc drive using a tracking actuator, a feed motor, and an objective lens, including monitoring whether the tracking actuator deviates from a dynamic range based on a signal controlling the feed motor when tracking is performed; and returning the objective lens connected to the tracking actuator to a neutral point when it is determined that the tracking actuator deviates from the dynamic range.

9 Claims, 3 Drawing Sheets

APPARATUS AND METHOD FOR CONTROLLING TRACKING IN DISC DRIVE BY MONITORING TRACKING ACTUATOR DEVIATION

CROSS-REFERENCE TO RELATED APPLICATIONS

This application claims the benefit of Korean Application No. 2002-60100, filed Oct. 2, 2002, in the Korean Intellectual Property Office, the disclosure of which is incorporated herein by reference.

BACKGROUND OF THE INVENTION

1. Field of the Invention

The present invention relates to an apparatus and method for controlling tracking in a disc drive, and, more particularly, to an apparatus and method for controlling tracking in a disc drive capable of preventing a tracking actuator and an objective lens from being damaged.

2. Description of the Related Art

Generally, when tracking is performed in an optical disc drive for reading data from a disc or recording data on the disc, the disc drive drives a tracking actuator within a dynamic range of the tracking actuator shown in FIG. 1. When the tracking actuator deviates from the dynamic range, a neutral point of an objective lens is corrected by moving a pickup body using a feed motor, and thereafter the tracking actuator is driven within the dynamic range again.

Tracking control using the tracking actuator and the feed motor is repeatedly performed from an inner part to an outer part of the disc, until an end for a tracking operation is requested. The dynamic range is a range corresponding to a distance the tracking actuator can move in a tracking direction in a stable state for the performance of the optical pickup. A movable range shown in FIG. 1 is a range corresponding to a physical distance that the tracking actuator can move, regardless of the performance of the optical pickup.

However, if the feed motor or a feed motor drive malfunctions in performing tracking control, or the tracking actuator is shifted too much from being unstably pulled in the optical disc drive after accessing the disc, overcurrent flows through tracking coils for a long time. The over-shift means that the tracking actuator comes too close to a physical limitation of the movable range in the tracking direction. If the overcurrent flows through the tracking coils for a long time, the tracking coils emit heat that can damage the tracking actuator and the objective lens connected thereto.

For example, when the feed motor and the feed motor driver operate normally, as shown in FIG. 2A, the neutral point of the objective lens is corrected at positions S1, S2, S3, and S4 so that the tracking actuator always operates only within the dynamic range. In FIG. 2A, the axis labeled Sx is a distance moved by the objective lens in the tracking direction due to operation of the tracking actuator and the feed motor. The axis labeled $V_{FMO}$ is a deviation level of the objective lens deviating from the neutral point, which is expressed as a control signal for controlling the feed motor. A reference character V1 represents a maximum value of the control signal for controlling the feed motor when the tracking actuator operates within the dynamic range. Thus, when tracking is performed from the inner part to the outer part of the disc, the objective lens returns to the neutral point at the positions S1, S2, S3, and S4 under the control of the control signal V1 for the feed motor so that the tracking actuator always operates within the dynamic range.

However, when the feed motor or the feed motor driver operates abnormally, as shown in FIG. 2B, the tracking actuator deviates from the dynamic range and may approach the limit of the movable range. In FIG. 2B, a reference character S1 represents the limit of the dynamic range, and a reference character S2 represents the limit of the movable range. The axes labeled Sx and $V_{FMO}$ represent the same terms as those described in FIG. 2A. V1 is the level of the control signal for the feed motor provided when the objective lens is positioned at the position S1 in the tracking direction, which is the distance from the neutral point. V2 is the level of the control signal for the feed motor provided when the objective lens is positioned at the position S2 in the tracking direction.

If the tracking actuator deviates from the dynamic range as shown in FIG. 2B, and if the neutral point of the objective lens is not corrected, overcurrent flows through the tracking coils and the tracking coils emit heat, thereby damaging the tracking actuator and the objective lens.

SUMMARY OF THE INVENTION

It is an aspect of the present invention to provide a method and apparatus for controlling tracking in a disc drive, capable of preventing an objective lens and a tracking actuator from being damaged.

It is another aspect of the present invention to provide a method and apparatus for controlling tracking in a disc drive by monitoring a deviation from a neutral point of an objective lens in the disc drive.

Additional aspects and/or advantages of the invention will be set forth in part in the description that follows and, in part, will be obvious from the description, or may be learned by practice of the invention.

To achieve the above and/or other aspects of the present invention, there is provided a method of controlling tracking in a disc drive using a tracking actuator, a feed motor, and an objective lens including monitoring whether the tracking actuator deviates from a dynamic range based on a signal controlling the feed motor when tracking is performed; and returning the objective lens connected to the tracking actuator to a neutral point when it is determined that the tracking actuator deviates from the dynamic range.

The returning of the objective lens is performed by turning off a tracking servo of the disc drive.

The monitoring whether the tracking actuator deviates from a dynamic range includes comparing the signal controlling the feed motor with a predetermined reference value. The monitoring further includes monitoring whether the signal controlling the feed motor is greater than the predetermined reference value for a predetermine time, when the signal controlling the feed motor is greater than the predetermined reference value. The predetermined reference value is set based on the dynamic range and a movable range of the tracking actuator, or set at a value approaching a limit of the dynamic range of the tracking actuator.

To achieve the above and/or other aspects of the present invention, there is provided a tracking control apparatus for a disc drive having a tracking actuator and a feed motor, the tracking control apparatus comprising: an optical pickup outputting a radio frequency signal from a signal picked up from a disc loaded in the disc drive when the disc drive is driven; a radio frequency amplifier outputting a tracking error signal detected from the radio frequency signal; a servo control unit outputting a control signal for driving the tracking actuator and the feed motor based on the tracking error signal output from the radio frequency amplifier; and a control unit monitoring the control signal for driving the feed motor output from the servo control unit, and, when it is determined that the tracking actuator deviates from a dynamic range, controlling the servo control unit to return an objective lens connected to the tracking actuator to a reference position.

The control unit controls the servo control unit to turn a tracking servo off to return the objective lens to the reference position, preventing damage to the tracking actuator and the objective lens when an overcurrent flows through tracking coils due to the tracking actuator deviating from the dynamic range.

The control unit compares the control signal for driving the feed motor with a predetermined reference value, and, when the control signal is greater than the predetermined reference value for a predetermined time, it is determined that the tracking actuator deviates from the dynamic range.

To achieve the above and/or other aspects according to the present invention, there is provided a tracking control apparatus for a disc drive having a tracking actuator, an objective lens connected to the tracking actuator, and a feed motor, the tracking control apparatus including a servo control unit receiving a tracking error signal based upon a signal from a disc in the disc drive and outputting a control signal for driving the tracking actuator and the feed motor; and a control unit monitoring the control signal for driving the feed motor and controlling the servo control unit to return the tracking actuator to a reference position when the controller determines that the tracking actuator deviates from a dynamic range.

These, together with other aspects and/or advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and advantages of the invention will become apparent and more readily appreciated from the following description of the preferred embodiments, taken in conjunction with the accompanying drawings, of which.

DETAILED DESCRIPTION OF THE PREFERRED EMBODIMENT

Figure 1:
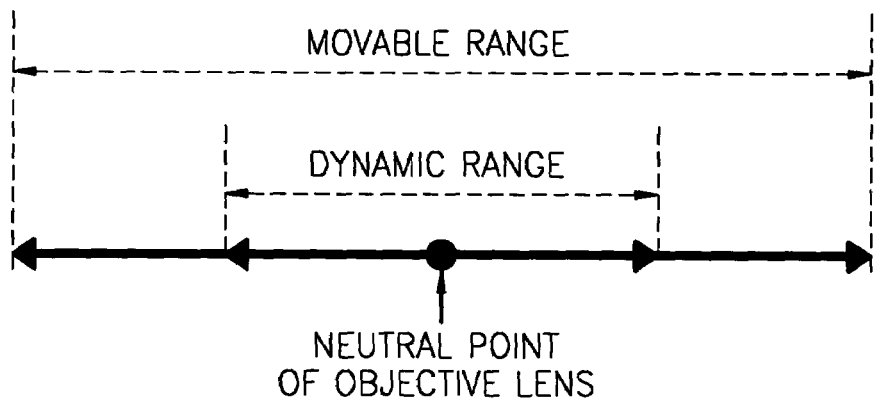
FIG. 1 shows a dynamic range and a movable range of a tracking actuator in performing tracking control in a conventional disc drive.

Hereinafter, an embodiment of the present invention will be described in detail with reference to the attached drawings, wherein the like reference numerals refer to the like elements throughout. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

Figure 3:
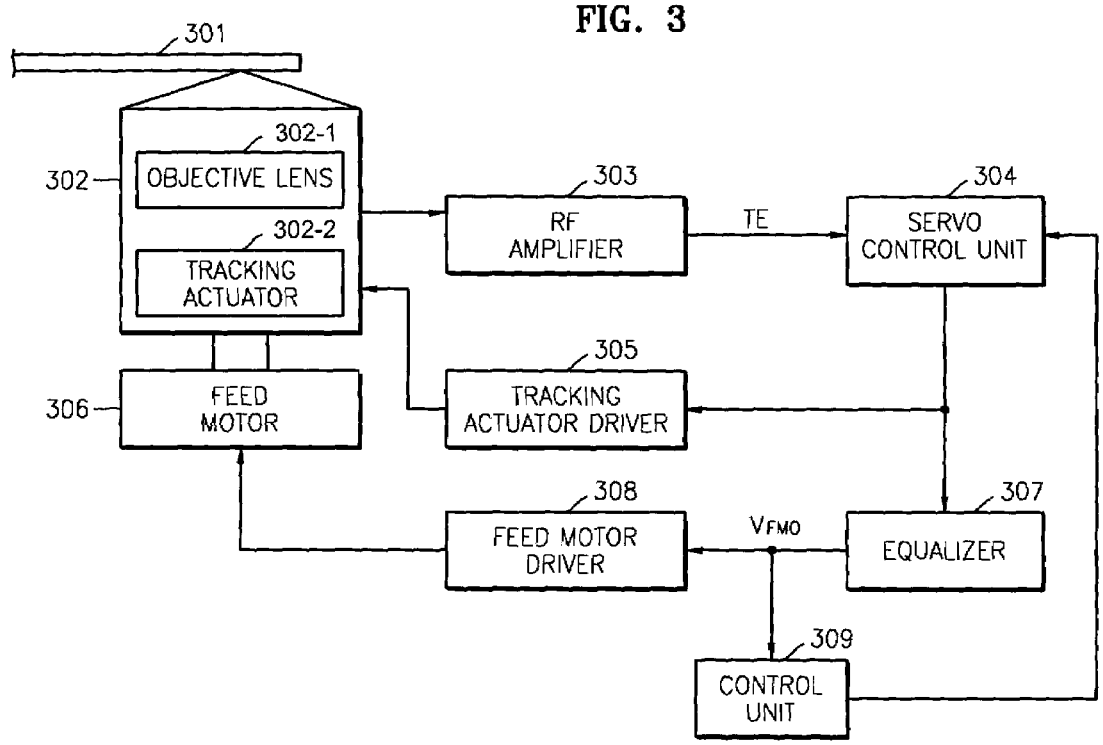
FIG. 3 is a block diagram of a disc drive having a tracking control apparatus according to an embodiment of the present invention.

As shown in FIG. 3, a disc drive having a tracking control apparatus according to the present invention includes a disc 301, an optical pickup 302, a radio frequency (RF) amplifier 303, a servo control unit 304, a tracking actuator driver 305, a feed motor 306, an equalizer 307, a feed motor driver 308, and a control unit 309.

The disc 301 is an optical medium such as a compact disc (CD) or a digital versatile disc (DVD). The disc 301 may be readable and/or writable.

When the disc drive is driven, the optical pickup 302 converts a signal optically picked up from the disc 301 into an electrical signal (i.e., an RF signal), and outputs the electrical signal. The optical pickup 302 includes an objective lens 302-1 and a tracking actuator 302-2.

The RF amplifier 303 detects a tracking error signal TE and a focusing error signal from the RF signal sent from the optical pickup 302, and outputs the tracking error signal TE and the focusing error signal to the servo control unit 304.

The servo control unit 304 performs compensation filtering on the tracking error signal TE, and outputs a control signal for driving the tracking actuator 302-2 and a control signal for controlling the feed motor 306. The control signal for driving the tracking actuator 302-2 is the same as the control signal for controlling the feed motor 306. The same method performed in servo control units included in conventional disc drives is used for generating both the control signal for driving the tracking actuator 302-2 and the control signal for controlling the feed motor 306 based on the tracking error signal TE.

The tracking actuator driver 305 drives the tracking actuator 302-2 by the control signal output from the servo control unit 304 to move the objective lens 302-1 in a tracking or radial direction of the disc 301, thereby performing tracking control.

Figure 2A:
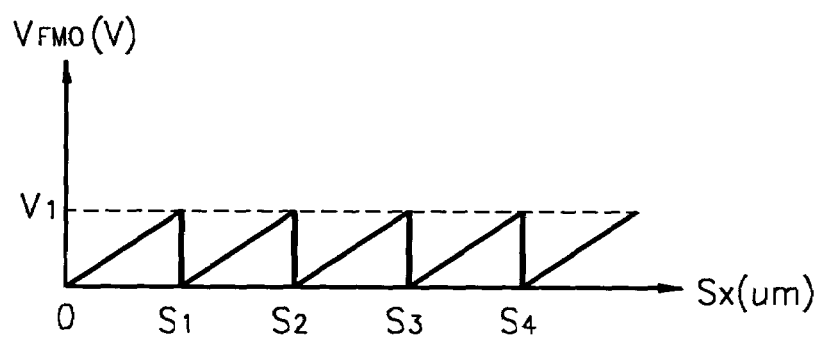
FIG. 2A shows the level of a control signal for controlling a feed motor versus a moving distance of an objective lens in a tracking direction when the feed motor and a feed motor driver operate normally.
Figure 2B:
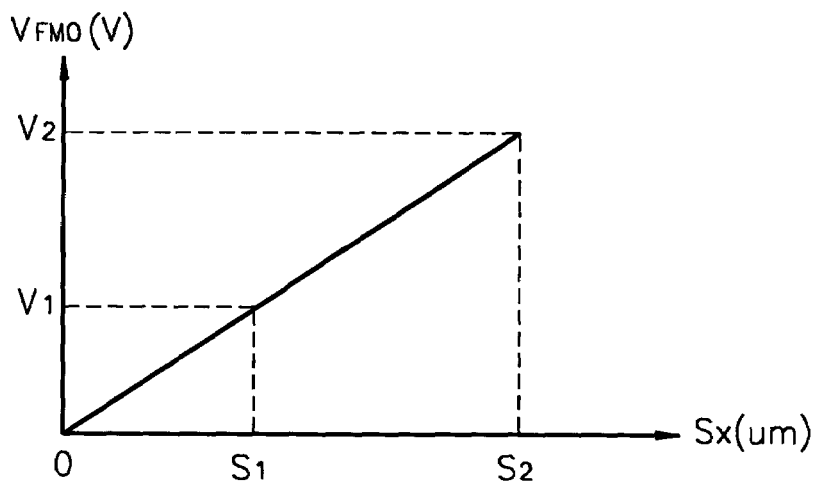
FIG. 2B shows the level of a control signal for controlling a feed motor versus a moving distance of an objective lens in a tracking direction when the feed motor or a feed motor driver operate abnormally.

The equalizer 307 passes only a low frequency band signal from the control signal output from the servo control unit 304 because the feed motor 306 operates within a low frequency band. The low frequency band signal output from the equalizer 307 is denoted by $V_{FMO}$. The $V_{FMO}$, as described with reference to FIG. 2, represents an amount of deviation of the objective lens from a neutral point and is expressed as the control signal for controlling the feed motor 306.

The feed motor driver 308 drives the feed motor 306 according to the control signal for the feed motor 306 output from the equalizer 307. The feed motor 306 is controlled by the feed motor driver 308 and moves the body of the optical pickup 302 in the tracking direction. A moving distance of the feed motor 306 is a distance that the deviated objective lens 302-1 moves to return to the neutral point.

The control unit 309 monitors whether the tracking actuator 302-2 deviates from the dynamic range based on the control signal for the feed motor 306 output from the equalizer 307. That is, the control unit 309 compares the control signal for the feed motor 306 with a predetermined reference value. The reference value, as shown in FIG. 1, may be a voltage that sets the tracking actuator 302-2 at a center of the dynamic range and a movable range of the tracking actuator 302-2, or a voltage that sets the tracking actuator 302-2 close to the limit of the dynamic range of the tracking actuator 302-2. The reference value may be set based on experimental results showing the point at which the tracking actuator 302-2 and the objective lens 302-1 are damaged when the tracking actuator 302-2 deviates from the limit of its dynamic range.

If the control signal for the feed motor 306 is greater than the reference value, according to the result of monitoring by the control unit 309, it is determined that the tracking actuator 302-2 deviates from the dynamic range. The control unit 309 monitors whether a state in which the control signal for the feed motor 306 is greater than the reference value is maintained for a predetermined time. If it is determined that the control signal for the feed motor 306 is greater than the reference value for the predetermined time, the control unit 309 outputs a control signal, requesting that a tracking servo (not shown) be turned off, to the servo control unit 304 to return the objective lens 302-1 to the neutral point. Thus, the servo control unit 304 turns the tracking servo off, and the objective lens 302-1 returns to the neutral point. Thereafter, the control unit 309 returns to an initialization routine of the disc drive or turns the tracking servo on so that the tracking can be controlled from the neutral point of the objective lens 302-1.

Figure 4:
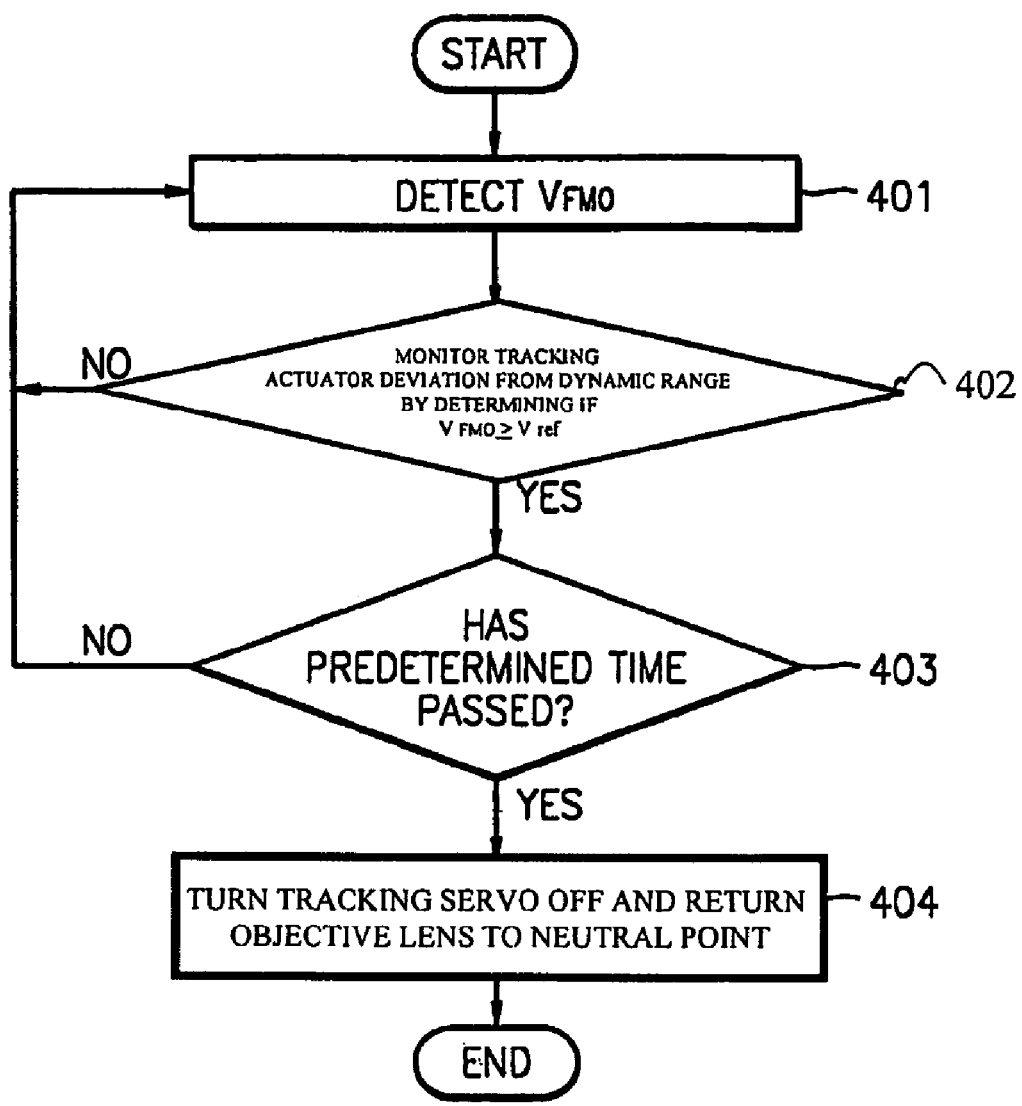
FIG. 4 is a flowchart of a method for controlling tracking in a disc drive according to an embodiment of the present invention.

FIG. 4 is a flowchart of a method for controlling tracking according to the present invention.

If the disc drive is set to a tracking mode, the optical pickup 302 performs a tracking operation from the inner part to the outer part of the disc 301. At this time, the control unit 309 detects a signal $V_{FMO}$ generated during tracking in operation 401. The signal $V_{FMO}$ is a control signal for the feed motor 306 generated according to the moving distance of the tracking actuator 302-2, as explained with reference to FIG. 3.

In operation 402, the detected signal $V_{FMO}$ is compared with a predetermined reference value Vref, and then it is determined whether the tracking actuator 302-2 deviates from the dynamic range. That is, if the signal $V_{FMO}$ is greater than the reference value Vref, it is determined that the tracking actuator 302-2 deviates from the dynamic range. In contrast, if the signal $V_{FMO}$ is not greater than the reference value Vref, it is determined that the tracking actuator 302-2 operates within the dynamic range. The reference value Vref is the same as the predetermined reference value explained with reference to FIG. 3.

If the control unit 309 determines that the tracking actuator 302-2 operates within the dynamic range, operation of the control unit 309 returns to operation 401, and continuously monitors the signal $V_{FMO}$. The monitoring process is repeatedly performed until the tracking operation is stopped.

If the signal $V_{FMO}$ is greater than the reference value Vref in operation 402, the control unit 309 determines whether a predetermined time has passed in operation 403. The predetermined time is set to accurately determine a state in which the signal $V_{FMO}$ is greater than the reference value Vref. For example, the predetermined time must be set so that it is not mistakenly determined that the signal $V_{FMO}$ is greater than the reference value Vref due to an operational error of the disc drive. If it is determined that the predetermined time has not passed in operation 403, operation of the control unit 309 returns to operation 401. However, if it is determined that the predetermined time has passed in operation 403, then the control unit 309 turns the tracking servo off to return the objective lens 302-1 to the neutral point in operation 404.

As described above, when overcurrent flows through tracking coils due to a tracking actuator deviating from its dynamic range, the tracking actuator and an objective lens are prevented from being damaged by turning a tracking servo off and returning the objective lens to a neutral point thereof.

Although an embodiment of the present invention has been shown and described, it will be appreciated by those skilled in the art that changes may be made in this embodiment without departing from the principles and spirit of the invention, the scope of which is defined in the claims and their equivalents.

What is claimed is:

1. A method of controlling tracking in a disc drive using a tracking actuator, a feed motor, and an objective lens comprising:

monitoring whether the tracking actuator deviates from a dynamic range based on a signal controlling the feed motor when tracking is performed, wherein the monitoring comprises comparing the signal controlling the feed motor with a predetermined reference value, and determining that the tracking actuator deviates from the dynamic range when the signal controlling the feed motor is greater than the predetermined reference value for a predetermined time; and returning the objective lens connected to the tracking actuator to a neutral point directly in response to the determining that the tracking actuator deviates from the dynamic range, wherein the predetermined reference value is set based on the dynamic range and a movable range of the tracking actuator.

2. The method of claim 1, wherein the returning of the objective lens is performed by turning off a tracking servo of the disc drive.

3. The method of claim 1, wherein the predetermined reference value is set at a value corresponding to a maximum limit of the dynamic range of the tracking actuator.

4. A tracking control apparatus for a disc drive having a tracking actuator, an objective lens connected to the tracking actuator, and a feed motor, the tracking control apparatus comprising:

an optical pickup outputting a radio frequency signal from a signal picked up from a disc loaded in the disc drive when the disc drive is driven;

a radio frequency amplifier outputting a tracking error signal detected from the radio frequency signal;

a servo control unit outputting a control signal for driving the tracking actuator and the feed motor based on the tracking error signal output from the radio frequency amplifier; and a control unit monitoring the control signal for driving the feed motor output from the servo control unit, wherein the control unit compares the control signal for driving the feed motor with a predetermined reference value, and, when the control signal is greater than the predetermined reference value for a predetermined time, determines that the tracking actuator deviates from the dynamic range and, directly in response to determining that the tracking actuator deviates from a dynamic range, controls the servo control unit to return the objective lens connected to the tracking actuator to a reference position, wherein the predetermined reference value is set based on the dynamic range and a movable range of the tracking actuator.

5. The tracking control apparatus of claim 4, wherein the control unit controls the servo control unit to turn a tracking servo off to return the objective lens to the reference position, preventing damage to the tracking actuator and the objective lens when an overcurrent flows through tracking coils due to the tracking actuator deviating from the dynamic range.

6. A tracking control apparatus for a disc drive having a tracking actuator, an objective lens connected to the tracking actuator, and a feed motor, the tracking control apparatus comprising:

a servo control unit receiving a tracking error signal based upon a signal from a disc in the disc drive and outputting a control signal for driving the tracking actuator and the feed motor;

a control unit monitoring the control signal for driving the feed motor, wherein the control unit compares the control signal for driving the feed motor with a predetermined reference value, and, when the control signal is greater than the predetermined reference value for a predetermined time, determines that the tracking actuator deviates from a dynamic range, and the control unit further directly controls the servo control unit to return the tracking actuator to a reference position when the controller determines that the tracking actuator deviates from the dynamic range; and a tracking actuator driver that drives the tracking actuator using the control signal output from the servo control unit to move the objective lens in a tracking or radial direction of the disc, wherein the predetermined reference value is set based on the dynamic range and a movable range of the tracking actuator.

7. The tracking control apparatus of claim 6, wherein the disc is a compact disc (CD) or a digital versatile disc (DVD).

8. The tracking control apparatus of claim 6, further comprising an equalizer receiving the control signal output from the servo control unit and outputting a low frequency band signal, the low frequency band signal representing an amount of deviation of the objective lens from a neutral point within the dynamic range.

9. The tracking control apparatus of claim 8, further comprising a feed motor driver driving the feed motor to move the tracking actuator using the low frequency band signal output from the equalizer, a moving distance of the feed motor being a distance the tracking actuator is moved to return the objective lens to the neutral point.

* * * * *